I. HUSBY.
LEVELING INSTRUMENT.
APPLICATION FILED AUG. 30, 1915.
1,231,162.
Patented June 26, 1917.
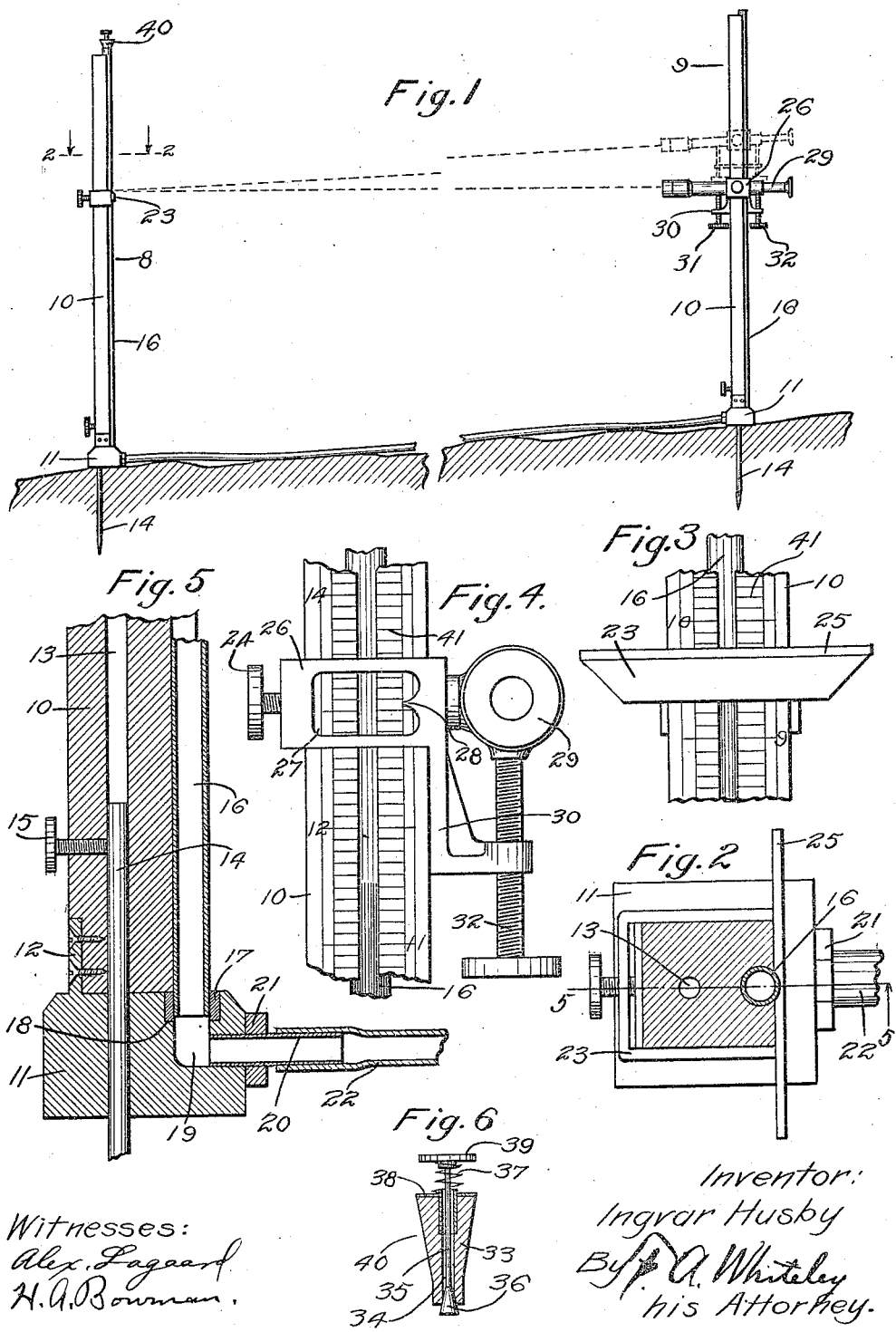
Witnesses:
Alex. Lagaard
H. A. Bowman
Inventor:
Ingvar Husby
By A. Whiteley
his Attorney.

UNITED STATES PATENT OFFICE.

INGVAR HUSBY, OF ST. PAUL, MINNESOTA.

LEVELING INSTRUMENT.

1,231,162. Specification of Letters Patent. Patented June 26, 1917.

Application filed August 30, 1915. Serial No. 47,940.

*To all whom it may concern:*

Be it known that I, INGVAR HUSBY, a citizen of the United States, residing at St. Paul, in the county of Rice and State of Minnesota, have invented certain new and useful Improvements in Leveling Instruments, of which the following is a specification.

My invention relates to leveling instruments and has for its object to provide a pair of hollow standards with a tubular connection having water therein for establishing a horizontal line, and to provide a telescope attachment to one of said standards which can be oscillated to sight along different slopes in a simple manner, to be later described, for the purpose of establishing grades.

The common forms of telescopic leveling instruments use a pair of spirit levels for setting the telescope in a horizontal position. I employ a water level which has its standards placed a considerable distance apart and so insure very accurate alinement. My device at the same time reads the difference in height between two stations and can be set in angular relation to the horizontal for determining any slope used for ditches, sewers, roads, lawns and the like.

The full objects and advantages of my invention will appear in connection with the detailed description thereof and are particularly pointed out in the claims.

In the drawings, illustrating the application of my invention in one form,—

Figure 1 is an elevational view of my leveling instruments showing the parts in place and the manner of using them. Fig. 2 is a section on line 2—2 of Fig. 1. Fig. 3 is a face view of the left-hand standard shown in Fig. 1 taken in the vicinity of the pointer. Fig. 4 is a similar view of the right-hand standard. Fig. 5 is a section of the lower portion of the left-hand standard taken on line 5—5 of Fig. 2. Fig. 6 is a sectional view of the valve stopper taken through the axis of the same.

As shown, I provide a pair of standards 8 and 9 comprising an upright member 10 having screwed upon the lower end thereof a foot or base 11. Base 11 is provided with an enveloping flange 12 by means of which it is screwed to said upright member 10. Each standard has a longitudinal hole 13 extending through the base 11 and up into the upright member 10. In this hole is placed a rod 14 which may be projected below base 11 or completely housed within said upright member 10 and is held in place by a thumb screw 15. Rod 14 is pointed at its lower end and serves as a stake for securing the standard in the ground in an upright position and also, by receding within the member 10, permits the standard to be placed upon a flat solid surface or to be easily carried about. Within the upright member 10 is housed a glass tube 16 which projects somewhat beyond one side of said member 10 and exposes a portion of said tube to view from the outside, as most clearly shown in Figs. 2, 3 and 4. Tube 16 extends throughout the entire length of member 10 and is seated at its lower end in a rubber ring 17 resting upon a shoulder 18 within the base 11. Tube 16 communicates by means of a channel 19 in said base 11 with a metal tube 20 screwed in a horizontal position into said base 11 and held in place with a lock nut 21. A rubber hose 22, preferably one hundred feet long, connects tubes 20 of each of the standards 8 and 9, thus affording a water-tight communication between said glass tubes 16 of each standard.

A scale 41, preferably in inches and tenths of an inch, or in tenths and hundredths of a foot, is placed upon the side of member 10 through which tube 16 projects, as clearly shown in Figs. 3 and 4. A runner 23 is slidably positioned in front of the scale 41 on the standard 8 and can be locked in any desired place upon said member 10 by means of a thumb screw 24. The upper edge 25 of runner 23 may be leveled to form a sharp edge for accurately reading the scale. A somewhat similar runner 26 serves the same purpose on standard 9. On the front side of runner 26 is provided an opening 27 in which is formed a pointer 28. On preferably the right side of said runner is detachably pivoted a telescope 29 whose axis of oscillation is in horizontal alinement with pointer 28. From a depending bracket 30 issue two vertical thumb screws 31 and 32 which engage with the bottom of the telescope 29, one on each side of the pivot of oscillation of said telescope, and provide means whereby micrometric oscillations of said telescope may be secured.

A valve stopper 40, such as shown in Fig. 6, is employed in conjunction with the top of one of tubes 16 for a purpose to be later explained. A rubber stopper 33 is provided with a central bore 34 flared at the smaller end. A rod 35 having an expanded head 36 operates within said bore 34 and head 36 is held seated against the stopper 33 by means of a spring 37 acting between a washer 38 and a button 39 fast on rod 35. A downward pressure on button 39 hence opens the valve.

In using my level the procedure is as follows. The valve stopper 40 is removed from the tube 16 and water is poured into said tube until the level in both tubes is about one-half the length of the standard. The stopper 40 is then replaced and the standards 8 and 9 set in the ground by means of the rods at the desired stations. Equilibrium of the water is attained by opening valve 40. By placing runners 23 and 26 at the top of the water column in each standard and adjusting the telescope to sight in line with runner 23 on standard 8, a perfectly horizontal line is obtained and stakes may now be set along this direction in the usual manner. The difference between the readings of the two runners at the same time will give the difference in elevation between the two stations. In designating grades it is customary to quote the number of inches rise to a hundred feet. By raising either of the runners 23 or 26 the required number of inches and accordingly adjusting the telescope, any grade line desired can be established without computation. Figs. 1 and 4 show the runner 26 raised, which would be proper for a downwardly sloping grade.

By this simple device leveling can be done to a great advantage. The device requires no preliminary adjusting and is extremely simple and convenient to operate. It is especially valuable on farms for establishing levels for tile or surface drainage, irrigation, road grading and filling, and for floors, foundations and other constructions where a simple effectual and inexpensive level is required.

I claim:

1. A leveling instrument comprising a pair of uprights each having a foot at the lower end thereof and a longitudinal groove and graduations along the side, a glass tube in each of said grooves seated in each of said feet, a flexible tube connecting both of said feet in communication with said glass tubes, there being water in the tubes, a movable runner on one of said standards, a movable runner on the other of said standards having a telescope pivotally attached thereto for sighting at said other runner, means on said runner for locking the same in any position on the upright, and a pair of screws engaging the telescope one on each side of the center of oscillation thereof for micrometrically adjusting the same to sight along any slope.

2. A leveling instrument comprising a pair of hollow uprights, a flexible tube connecting said uprights, there being water within said uprights and tube, frames supporting said hollow uprights, a slidable member mounted on the frame of one of said uprights, and a telescope pivoted to said member and adapted to be oscillated in a vertical plane relative thereto.

3. A leveling instrument comprising a pair of uprights each having a foot at the lower end thereof and a longitudinal groove and graduations along the side, a glass tube in each of said grooves seated in each of said feet, a flexible tube connecting both of said feet in communication with said glass tubes, there being water in said tubes, a movable runner on one of said standards, a movable runner on the other of said standards having a telescope pivotally attached thereto for sighting at said other runner, means on said runners for locking the same in any position, and means communicating with the telescope for micrometrically oscillating the same to sight along any slope.

4. A leveling instrument comprising a pair of hollow uprights provided with graduations along one side thereof, a flexible tube connecting said uprights, there being water in said tube and uprights, a runner slidably mounted on one of said uprights having a pointer movable along said graduations, a telescope pivoted to said runner in line with said pointer and adapted to oscillate in a vertical plane, means to lock said runner in place upon the upright, and means to adjustably oscillate said telescope.

In testimony whereof I affix my signature in presence of two witnesses.

INGVAR HUSBY.

Witnesses:
H. A. BOWMAN,
ALEX. LAGAARD.

Copies of this patent may be obtained for five cents each, by addressing the "Commissioner of Patents, Washington, D. C."